United States Patent [19]
Niedecker

[11] 3,739,427
[45] June 19, 1973

[54] SAUSAGE FILLING PROCESS AND APPARATUS

[76] Inventor: Herbert Niedecker, Am Ellerhang 6, Falkenstein, Germany

[22] Filed: Nov. 5, 1971

[21] Appl. No.: 196,165

[30] Foreign Application Priority Data
Nov. 5, 1970 Germany.................. P 20 54 389.9
July 26, 1971 Germany.................. P 21 37 278.1

[52] U.S. Cl. ................................................ 17/49
[51] Int. Cl. ........................................... A22c 21/00
[58] Field of Search ................... 17/45, 35, 42, 49, 17/41, 38; 99/176

[56] References Cited
FOREIGN PATENTS OR APPLICATIONS
8,689    2/1959    Japan........................................ 17/39

Primary Examiner—Robert Peshock
Attorney—Ralph D. Dinklage and Arnold Sprung

[57] ABSTRACT

In a sausage filling process, when the sausage casing is filled it is constricted near the end at a location where it contains filling material. Thus, nearly no air is locked into the casing. Upstream of the constriction suction is applied through the filling spout so that the material is sucked up or backsucked, rather than being left in the tail outside end of the filled casing. The sucked up material is discharged into the next casing to be filled so waste of filling material is also minimized.

11 Claims, 11 Drawing Figures

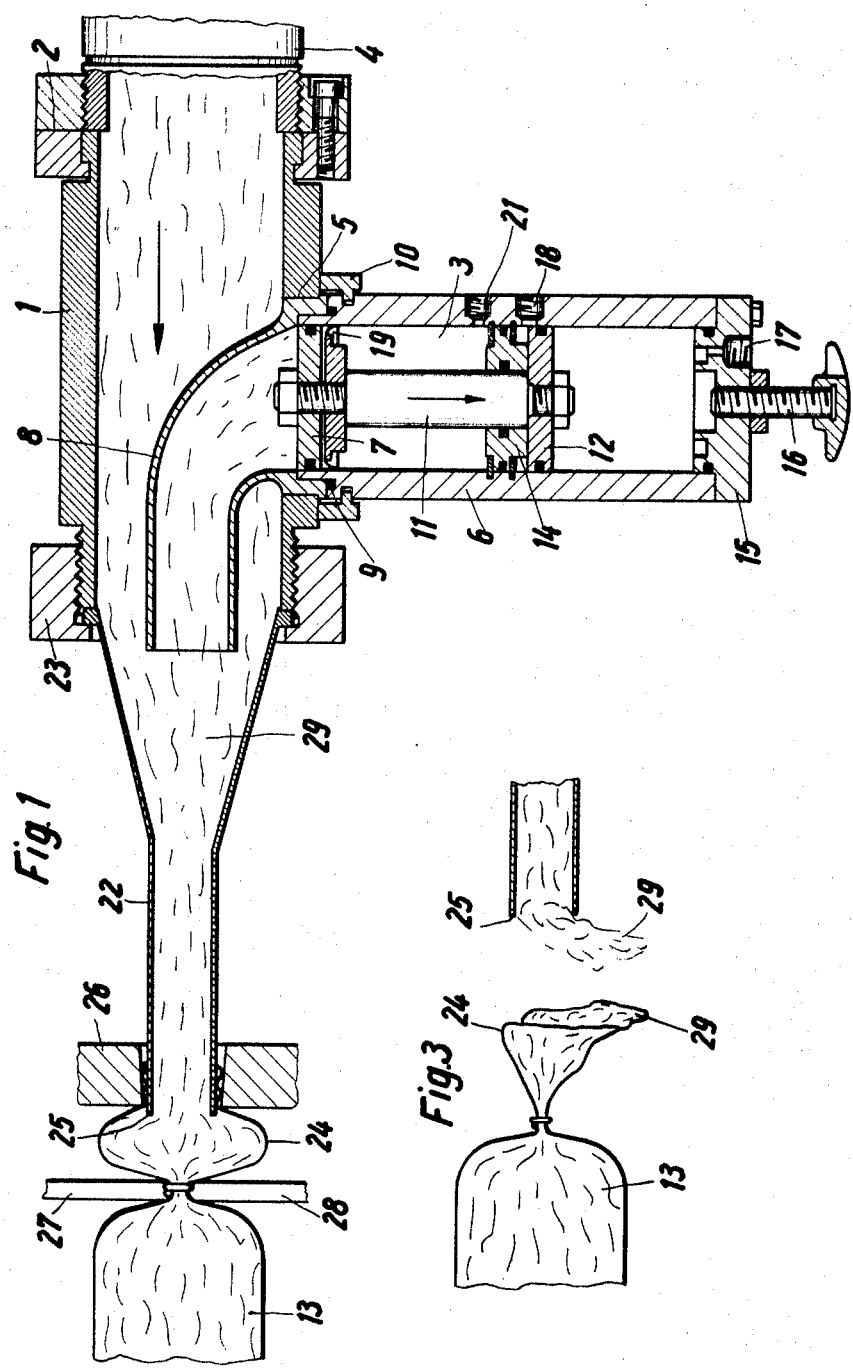

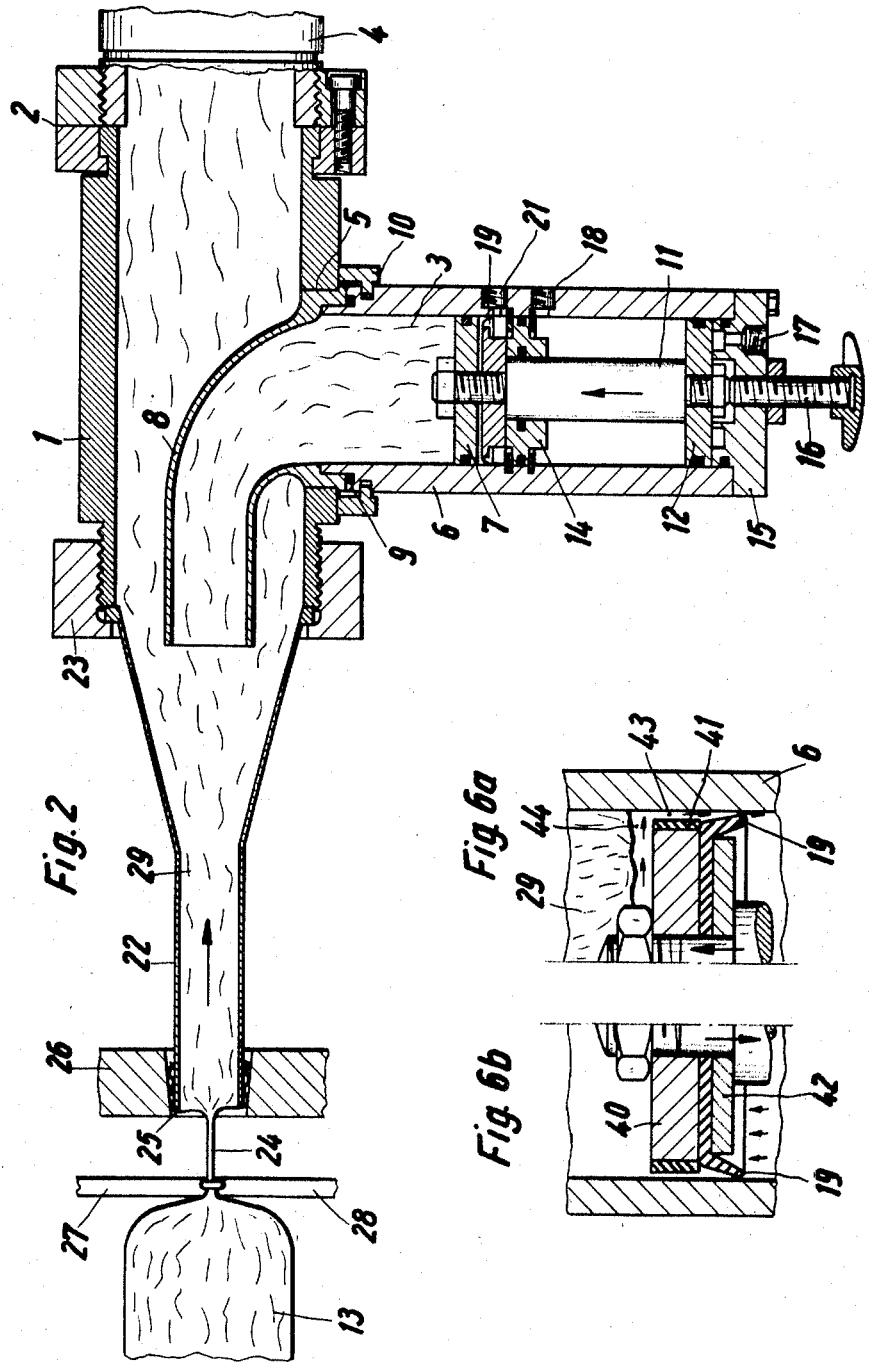

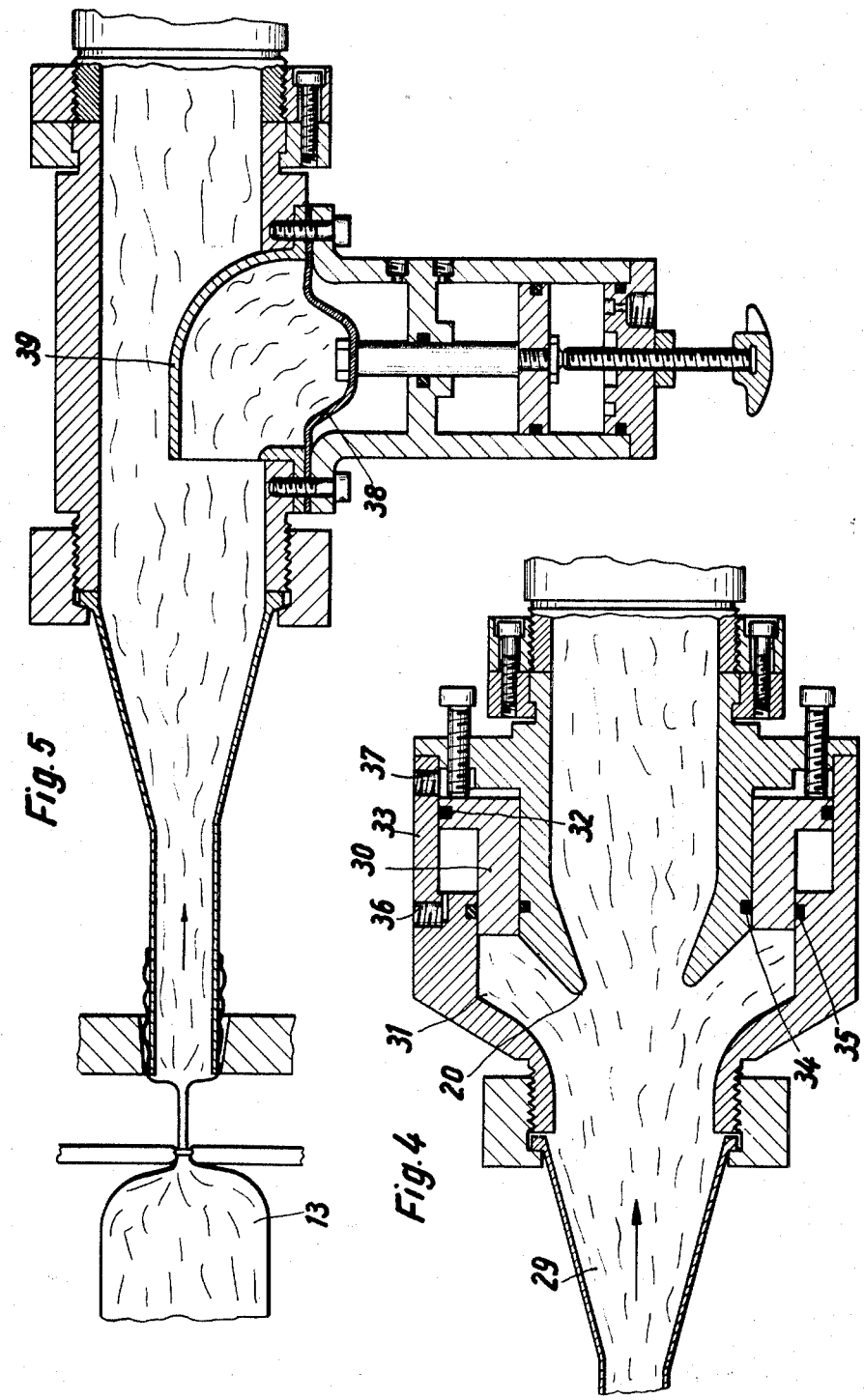

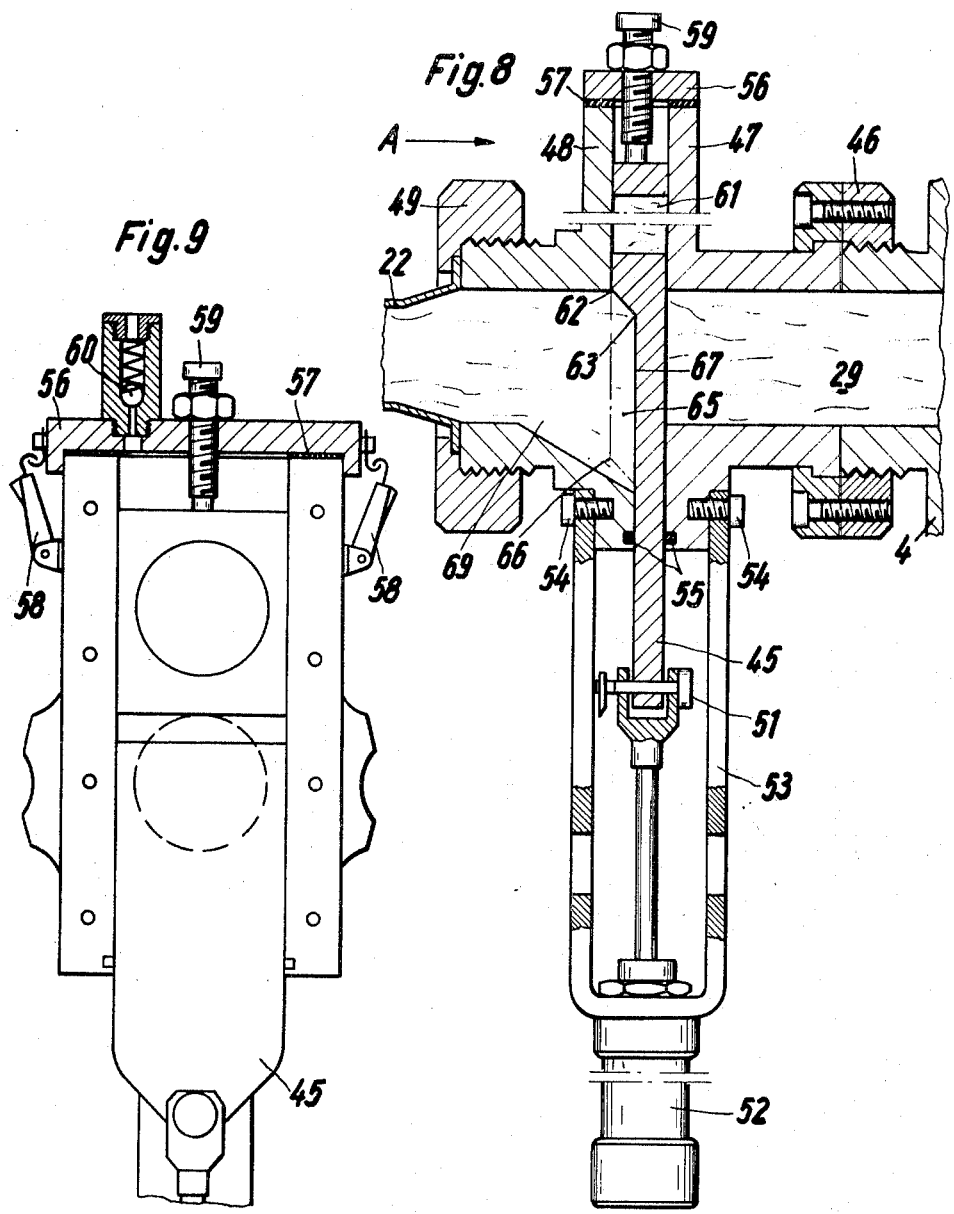

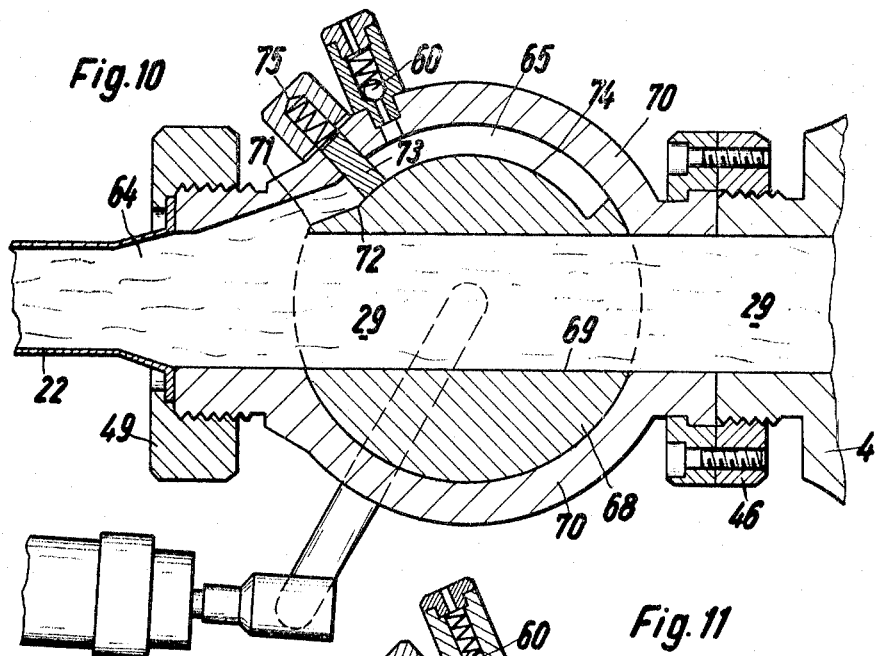
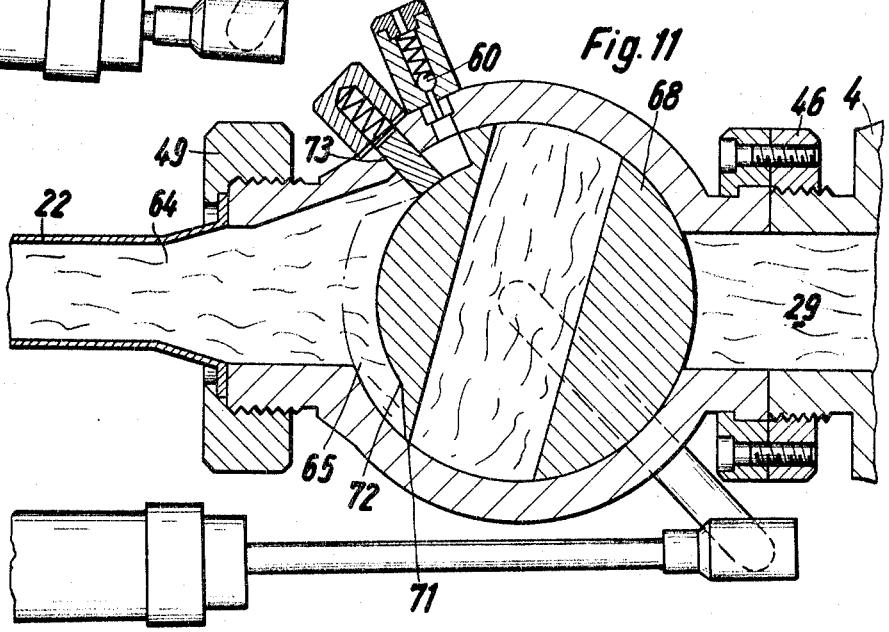

SAUSAGE FILLING PROCESS AND APPARATUS

This application relates to a novel sausage filling process and apparatus.

In operations in which tubular wrapper sections which have already been closed at one end are filled with viscous material, specifically, in operations in which tubes are filled which have been closed at one end, it is known to force the filling material into the wrapper while the end thereof is moving away from the filling spout, and to terminate the filling operation by a backsucking step carried out in the filling spout, whereafter the wrapper is closed. Such apparatus cannot be used to fill and close wrapper sections closed at one end when it is desired, e.g., in the filling of sausage casings, to remove the air from the ends of the wrapper. Besides, the remainder of the filling material which is disposed in the protruding end portion of the closed tube section will emerge from said end portion when the sausage has been filled and closed and removed from the filling spout. That remainder of the filling material may smear the means for holding the tube section. Besides, additional filling material may emerge from the protruding end of the filling spout when the filled tube section has been removed and may also cause smearing as well as a loss of filling material. It is an object of the invention to avoid these disadvantages and to ensure that there will be nearly no air within the wrappers.

In a process of filling tubular wrapper sections, which have been closed at one end, with viscous filling material, in which process the filling material is forced into the wrapper while the end thereof is moving away from the filling spout, whereafter the wrapper is closed, it is a feature of the invention that the filled wrapper section, e.g., a filled sausage casing, is closed directly at the end of the filling spout when the filling operation has been terminated and the filling material that has remained in the protruding end portion of the wrapper is then sucked back.

In the process according to the invention, the filling material contained in the wrapper is subjected to the closing operation. This ensures that the closed end of the wrapper will contain nearly no air. Because the filling material which has remained in the protruding end portion of the wrapper is sucked back to such an extent that the end of said filling material is approximately flush with the end of the filling spout, substantially no air is forced into the next tube section to be filled. Since the remainder of filling material is removed from the protruding end portion of the wrapper, the protruding end portion of the sausage will contain no sausage meat, which might emerge and smear the machinery and the packaging material. This is significant particularly with filling material having a low consistency, such as cooked sausage meat and meat of sausages that are to be heated, such as liver sausage, bierwurst, gelbwurst. Besides, the remainder of the sausage meat which is left in the wrapper is recovered to a large extent and in a simple manner whereas previously only part of this remainder was squeezed out of the protruding end portion by hand. Finally, no expanding filling material can emerge from the filling spout. Such emerging filling material would soil the machinery and would be lost to a large extent.

The process according to the invention is suitably carried out by an apparatus in which the backsucking operation is effected by means of a suction and pressure device, which is operated separately of the filling machine and comprises a guide duct, which is directed to the end of the filling spout so that the filling material is sucked from the protruding end portion of the sausage rather than from the filling machine. It is also suitable to provide such suction and pressure device in the form of an annular suction chamber, which forms the guide duct, and a power-operated, annular piston.

The suction and pressure device is suitably disposed between the outlet opening of the filling machine and the filling spout. The fittings, such as filling tubes and nuts, are designed so that the standardized elements of an existing filling machine may be used when the suction and pressure device is installed.

The suction and pressure device may consist of a cylindrical chamber, which contains a suction and pressure piston. The piston is operated under control of the control device of the sausage-closing machine in such a manner that the piston sucks the filling material immediately after the filled tube section has been closed. The filled sausage is then released by the holder, which is provided at the filling spout. The suction will be maintained until the next tube section has been fitted on the filling spout. As the next tube section is filled from the filling machine, the filling material which has been sucked by the piston is forced by the latter also into the tube section which is to be filled.

The guide duct may consist, e.g., of an elbow or of an annular duct or may be defined by a deflector plate. The guide duct serves to prevent a sucking of filling material by the suction and pressure device from the filling machine rather than from the protruding end portion of the sausage. The same object can be accomplished if the suction and pressure device is connected to an adapter, which is connected by a valve to the outlet of the filling machine.

The suction and pressure piston may be connected to a drive piston so that a tandem piston assembly is provided and pressure is applied to both ends of the drive piston in alternation for the suction and pressure operations. Instead of a tandem piston assembly, a suction and pressure piston may be used alone and caused to perform the suction stroke by a return spring. The means for driving the piston are suitably provided with a means to limit the stroke thereof so that the amount of filling material which is sucked is controlled.

The suction and pressure piston must be sealed at the cylinder wall so that no air can enter the filling material and no filling material can enter the drive chamber through the gap between said piston and cylinder. It is desirable to use for this purpose a seal which during the pressure stroke of the piston permits of a passage of occluded gases from the filling material, whereas the seal does not permit passage of the filling material itself. Such seal may consist, e.g., of a cup and permits removal of undesired occluded air from the filling material.

Alternatively, the suction and pressure device may consist of a gripped diaphragm, which is connected to an operating rod and during the suction and pressure operation is deflected toward the respective side.

The suction and pressure device is suitably connected to the adapter by a quick-action coupling. When the filling material which is processed has a high consistency so that the suction and pressure device is not required, said device may be removed and the adapter may be sealed with a cover. Because the suction and pressure device can easily be removed, it can easily be cleaned.

In carrying out the process according to the invention, it is suitable to use a shut-off valve, which during its closing movement pushes ahead or displaces filling material from the passage opening. According to the invention, that portion of the valve which closes the outlet opening has on that side which faces the end of the filling spout a recessed or setback portion defining a suction space.

When the valve is open, the filling material can move freely through the passage opening, whereas the latter is closed when the shut-off valve has been operated. With this arrangement, an expansion of the filling material to emerge from the filling machine after the filling operation is reliably prevented whereas the much smaller expansion of the filling material in the filling spout requires only a relatively small backsucking movement. As the shut-off valve is closed, it pushes ahead or displaces the filling material which is disposed in the passage opening. The filling material in the passage opening has now been replaced by the shut-off valve, which on that side which faces the end of the spout has a recessed or setback portion defining a suction space. The valve must be so thick that the recess or setback may be sufficiently large to ensure the required increase of the volume between the valve and the end of the filling spout whereby the suction space is formed. This increase in volume results in a suction, which causes the filling material to be sucked back. As a result, the protruding tube end portion fitted on the end of the spout is also sucked empty and a subsequent emergence of sausage meat from the filling spout will be avoided. The sausage meat should be sucked back to such an extent that it is approximately flush with the end of the spout so that a forcing of air into the next tube section being filled will be minimized. To control the amount of sausage meat which is sucked back, the volume of the suction space may be varied by a stop, which limits the movement of the gate valve to its closed position.

The device may comprise a flat gate valve, which is moved between two housing walls and sealed against the outside air. The gate valve may be operated by a compressed-air cylinder or a solenoid or by hand. As the shut-off valve is closed, that portion of the sausage meat which is contained in the passage opening of the shut-off valve is pushed upwardly. Because the thickness of the wall is decreased, a suction space is formed, which causes sausage meat to be sucked back from the end of the spout. As the valve is opened, this sausage meat is pushed back into the passage opening and extruded with the next portion. The sausage meat contained in the suction space is also extruded with the next portion of sausage meat and is homogeneously admixed thereto.

The flat gate valve may be designed to be disposed outside the passage opening for the filling material when the valve is open and that side of the valve which faces the filling machine may be tapered or otherwise formed to force the sausage meat back into the filling machine.

The shut-off valve may consist of a rotary valve. The cylindrical rotary valve has a bore which in the filling position connects the outlet opening of the filling machine to the inlet opening of the spout. During the movement of the valve to its closed position, the sausage meat is carried along in the bore of the valve and is shut off by the housing wall. Because filling material is removed at that wall of the rotary valve which faces the spout when the valve is closed, a space is also formed which in the closed position of the valve forms a suction space between the rotary valve and the spout. The rotary valve may also be operted by pneumatic, electric or mechanical means. When the rotary valve is opened or moved to its filling position, the sausage meat is pushed from the valve bore and the suction space into the spout together with the new filling material and is homogeneously admixed thereto. The stroke may also be limited so that the suction space can be varied and the amount of material which is sucked can be selected as desired.

Because the suction space is formed only as a result of the design of the shut-off valve, the structure is relatively simple and small in size and owing to its light weight can easily be attached to the filling machine. The fittings, such as filling spouts and nuts, are designed that the standardized parts of existing filling machines may be used without alternation when the shut-off valve provided with a backsucking device is installed. Besides, the device can be cleaned quickly and easily.

Embodiments of the process according to the invention will now be specifically described with reference to the drawings, in which FIG. 1 is a sectional view showing a suction and pressure device, which is attached to the filling machine and comprises a cylindrical chamber containing a suction and pressure piston, in a position immediately after the closing of the filled tube section.

FIG. 2 is a sectional view showing suction and pressure device of FIG. 1 when the same has sucked back the filling material.

FIG. 3 shows a tube section which has been removed from the filling spout and has not been subjected to the action of a suction and pressure device for the filling material.

FIG. 4 shows a suction and pressure device having an annular chamber and an annular piston in sucking position.

FIG. 5 shows a suction and pressure device comprising a diaphragm, in sucking position.

FIG. 6 is an enlarged view showing the suction and pressure piston.

FIG. 8 shows the same shut-off valve in its closed position.

FIG. 9 is an elevation A showing the shut-off valve with one housing half removed.

FIG. 10 is a sectional view showing a rotary shut-off valve provided with backsucking means, in open position.

FIG. 11 shows the same valve in closed position.

Figure 7:
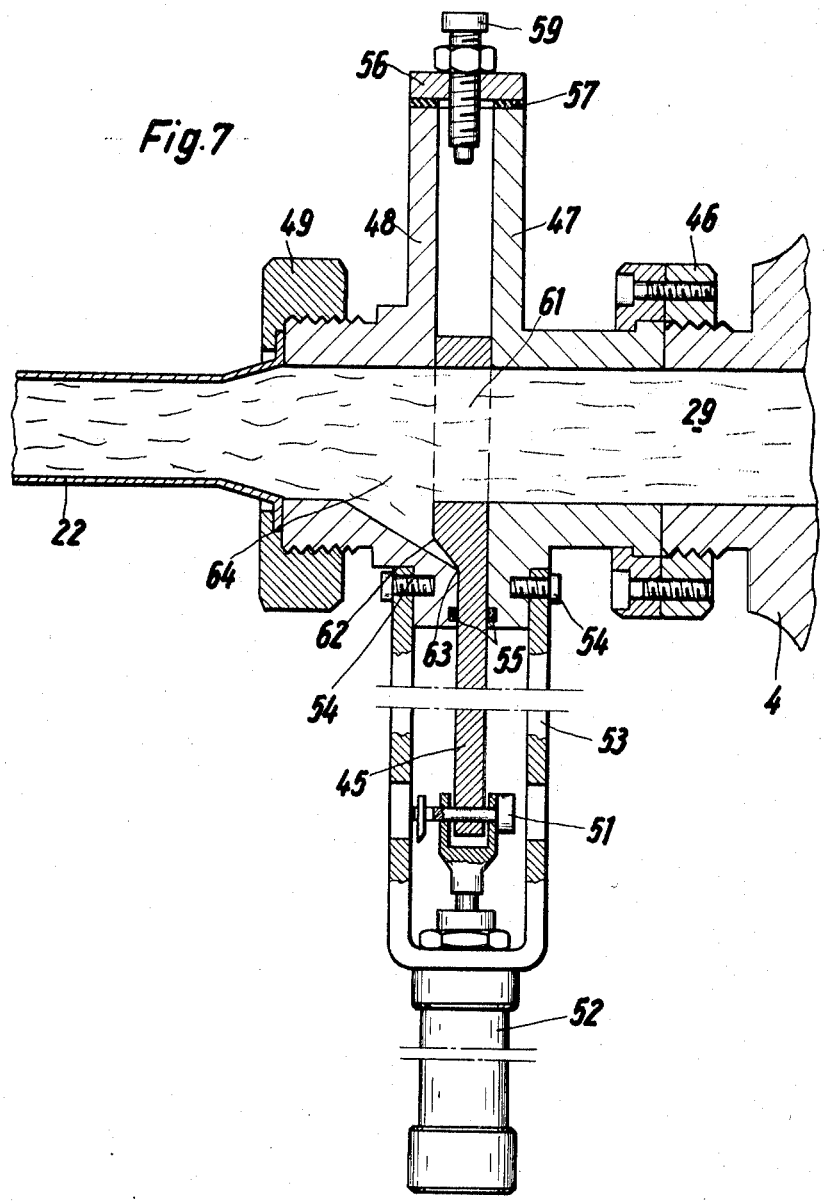
FIG. 7 is a longitudinal sectional view showing a flat gate shut-off valve with a backsucking means in open position.

The device shown in FIG. 1 comprises an adapter 1 and a split annular nut 2 to be fixed to a filling machine 4. A cylinder 6 defines a chamber 3, which contains a suction and pressure piston 7, and is inserted into a bore 5 of the adapter 1. An elbow 8 is connected to the cylinder 6 and forms a guide duct, which is directed toward an end 25 of the filling spout to ensure that the filling material will be sucked from a protruding sausage end portion 24 rather than from the filling machine 4. The cylinder 6 and the elbow 8 are sealed by a seal 9 and secured to the adapter 1 by a quick-action coupling 10.

The suction and pressure piston 7 is connected by a piston rod 11 to a drive piston 12. An intermediate member 14 is disposed between the suction and pressure piston 7 and the drive piston 12. An adjustable stop screw 16 is threaded into the cylinder bottom 15 and limits the stroke of the drive piston 12. Through air connections 17, 18, pressure can be applied to one end of the drive piston 12 or the other for the performance of the suction and pressure strokes. The speed of the stroke may be controlled by an orifice plate or choke, not shown.

A seal consisting preferably of a cup seal 19 is disposed under the suction and pressure piston 7 and permits passage of occluded air during the pressure stroke of the suction and pressure piston 7. The chamber behind the piston 7 can be vented through a bore 21. The filling material itself cannot pass through the very small gap around the piston 7. For processing extremely fluid filling material, a completely sealed piston 7 may be used because venting is not required in such case. During the suction stroke of the piston 7, the seal 19 contacts the cylinder wall 6 and ensures that the required suction will be produced as the suction and pressure piston 7 descends.

An existing filling spout 22 is connected to the adapter 1 by means of a nut 23 for holding the filling spout.

A sausage casing 24 is sealed on the end 25 of the filling spout by a holder 26 and is released when the filling operation has been completed. A displacing member 27 and closing means 28 of a closing machine are operated to close the end portion of a filled sausage 13.

FIG. 2 shows the same parts of the suction and pressure device with the suction and pressure piston 7, the piston rod 11 and the drive piston 12 in the position after the sucking operation. Immediately after the closing of the filled tube section 13, the suction and pressure piston 7 is retracted in the chamber 3 to suck by means of the elbow 8 and the filling spout 22 the filling material 29 from the protruding end portion 24 of the tube section 13. When a new tube section has been fitted on the filling spout during the filling operation the controlled piston 7 forces the filling material from the chamber 3 into the filling material 29 which flows in the filling spout 22.

FIG. 3 illustrates the condition of the end 25 of the filling spout when no suction device has been used and expanding filling material has emerged from the filling spout. Filling material 29 remains in the protruding sausage end portion 24 and must be squeezed out by hand.

In the suction and pressure device shown in FIG. 4, the suction and pressure piston consists of an annular piston 30, which is shown in FIG. 4 in its position after the sucking operation, in which an annular chamber 31 has been enlarged to suck filling material 29 from the end of the filling spout. Another annular piston 32 serves to drive the piston 30. An annular chamber 31 serves as suction and pressure chamber. Pressure can be applied to the drive piston 32 from either side through the air connections 36, 37. That end portion 20 of the inner wall of the annular chamber 31 which faces the end 25 of the filling spout tapers forwardly.

When the next filling operation begins, air is supplied at 37 and the drive piston 32 operates the annular piston 30 to force the filling material 29 into the next following tube section. Stroke-limiting means are provided to avoid sucking back of the filling material 29 behind the end 25 of the filling spout because this would result in the formation of an air space in front of the filling material.

In another embodiment, shown in FIG. 5, the suction and pressure member consists of a diaphragm 38, which is deflected inwardly and outwardly to perform the suction and pressure operations. The suction pipe has been replaced by a deflector plate 39.

FIGS. 6a and 6b are enlarged views showing the suction and pressure piston 7 of FIGS. 1 and 2. FIG. 6a illustrates the pressure stroke and FIG. 6b the suction stroke of the piston 7. The piston is composed of a plurality of parts, namely, a piston body 40 provided with a coating 41 of plastic material, a cup seal 19 and a backing disc 42. The coating 41 of plastic material and the cylinder wall 6 define an air gap 43, which has a width of about 0.1 millimeter and through which occluded air 44 can flow into the chamber behind the piston when the latter forces the sucked filling material 29 back into the filling spout 22. In this operation, the cup seal 19 lifts from the wall of the cylinder 6. During the suction stroke illustrated in FIG. 6b, the cup seal 19 is in firm contact with the wall of the cylinder 6 and produces the suction required for the suction stroke.

FIG. 7 shows a shut-off valve 45, which is connected between the outlet of a filling machine 4 and a filling spout 22. The shut-off valve 45 is connected to the filling machine 4 by a cap nut 46. The housing for the shut-off valve comprises housing halves 47, 48, which are interconnected by threaded fasteners and sealed by a gasket. The shut-off valve 45 is slidably mounted between the housing halves 47, 48. A cap nut 49 connects the filling spout 22 to the housing half 48. When the shut-off valve is open, the viscous filling material 29 can flow freely through the valve.

The shut-off valve 45 is operated by a pneumatic cylinder 52, to which it is connected by a pin 51. The cylinder 52 is connected to the housing halves 47, 48 by a fixing yoke 53 and screws 54. The passages where the shut-off valve 45 emerges from the housing may be sealed by seals 55.

The valve housing 47, 48 is provided with a cover 56 and a gasket 57. A quick-action coupling 58 is provided to facilitate the application and removal of the cover 56. When the cover 56 and the pin 51 have been removed, the shut-off valve 45 may be removed from the housing and cleaned. A stop screw 59 is provided in the cover 56 and enables an adjustment of the stroke of the shut-off valve 45 and of the amount of filling material which is sucked back.

A check valve 60 is provided in the cover and permits an escape of air through the shut-off valve 45 during its upward or closing movement.

The shut-off valve 45 is provided with a passage opening 61 and in this portion is relatively thick. The shut-off valve 45 is set back and thinner at its edges 62, 63. During the quick shut-off operation, a space 64 on that side of the shut-off valve 45 which faces the end of the filling spout is enlarged to form a suction space 65 between the phantom line 66 and a face 67 of the valve. The formation of this suction space results in the desired sucking back of the filling material in the filling spout, also at the end of the filling spout.

When the shut-off valve 45 is subsequently opened, the surface 62, 63 forces the filling material from the suction space 65 into the filling spout 22 whereafter the material is co-extruded from the latter.

FIG. 10 shows a rotary shut-off valve 68 provided with backsucking means in open position during the filling operation. The filling material passes from the filling machine 4 through a bore 69 of the rotary valve 68 into the filling spout 22. The rotary valve 68 is rotatably mounted in a valve housing 70 and may be operated by hand or machine. The rotary valve 68 has also setback or recessed edge portions 71, 72, and a space 65 is defined as a suction space between a wall 74 of the rotary valve 68 and the housing 70.

When the rotary valve 68 is open, the suction space 65 defined by its setback or recessed portions is separated from filling space 64 in the filling spout 22 by a sealing strip 73, which is urged into sealing position by a spring 75. A check valve 60 is provided to vent the free space 65.

During the closing movement of the rotary valve 68 to the position shown in FIG. 11, the filling material 29 contained in the rotary valve is severed and the space 75 between the rotary valve 68 and the end of the filling spout is enlarged by the suction space 65, which is indicated by the phantom line. An adjustable stop for the rotary valve 68 is provided and permits a decrease or increase of the size of the suction space 65 and of the amount of filling material which is sucked back.

In this embodiment too, the rotary valve 68 during its next opening movement forces the filling material in the suction space 65 into the filling spout 22 by means of the surface 71, 72 and the sealing strip 76.

It will be appreciated that the instant specification and examples are set forth by way of illustration and not limitation, and that various modifications and changes may be made without departing from the spirit and scope of the present invention.

What is claimed is:

1. In an apparatus for the filling of successive tubular wrappers, each closed at one end such as sausage casings, with viscous filling material such as sausage filling, comprising a filling spout to supply material to the open end of a wrapper, means for feeding material to said spout and thereby to said wrapper, means for discontinuing feeding of material to said spout and wrapper after a predetermined amount has been fed, and means for constricting the open end of said filled wrapper, the improvement which comprises means for applying suction to said filled wrapper after it has been constricted immediately upstream of the constriction, thereby to suck up any residue of filling material upstream of said constriction.

2. An apparatus according to claim 1, wherein said suction applying means includes a guide duct extending into the mouth of the filling spout, said filling material residue being sucked up into said guide duct.

3. An apparatus according to claim 2, wherein said guide duct comprises an annular suction chamber, said suction applying means including a power-operated annular piston displaceable within said suction chamber.

4. An apparatus according to claim 1, wherein said suction applying means includes a displaceable member whose movement in one direction produces suction to suck up said filling material and whose movement in the opposite direction produces pressure to expel the sucked up material.

5. An apparatus according to claim 4, wherein said suction applying means includes a cylindrical suction chamber and said displaceable member is a piston displaceable in said chamber.

6. An apparatus according to claim 5, wherein said suction applying means includes a drive piston operatively connected with said piston which operates in said suction chamber.

7. An apparatus according to claim 5, wherein said piston carries a seal contacting the chamber wall, said seal permitting the passage of occluded gases from the filling material during the pressure-providing displacement of said piston.

8. An apparatus according to claim 4, wherein said displaceable member comprises a diaphragm, said suction applying means comprising a diaphragm pump.

9. An apparatus according to claim 1, including an adapter extending between the spout and the means for feeding material to said spout, and a quick-action coupling connecting said adapter to said suction applying means.

10. An apparatus according to claim 1, said means for discontinuing feeding of material to said spout including a passage opening and means for closing ssid opening, said closing means being provided with a recessed portion defining a suction space directed toward the end of said spout, closing of said valve displacing material from the passage opening.

11. An apparatus according to claim 10, including an adjustable stop for the valve whereby the volume of said suction space can be varied.

* * * * *